UNITED STATES PATENT OFFICE.

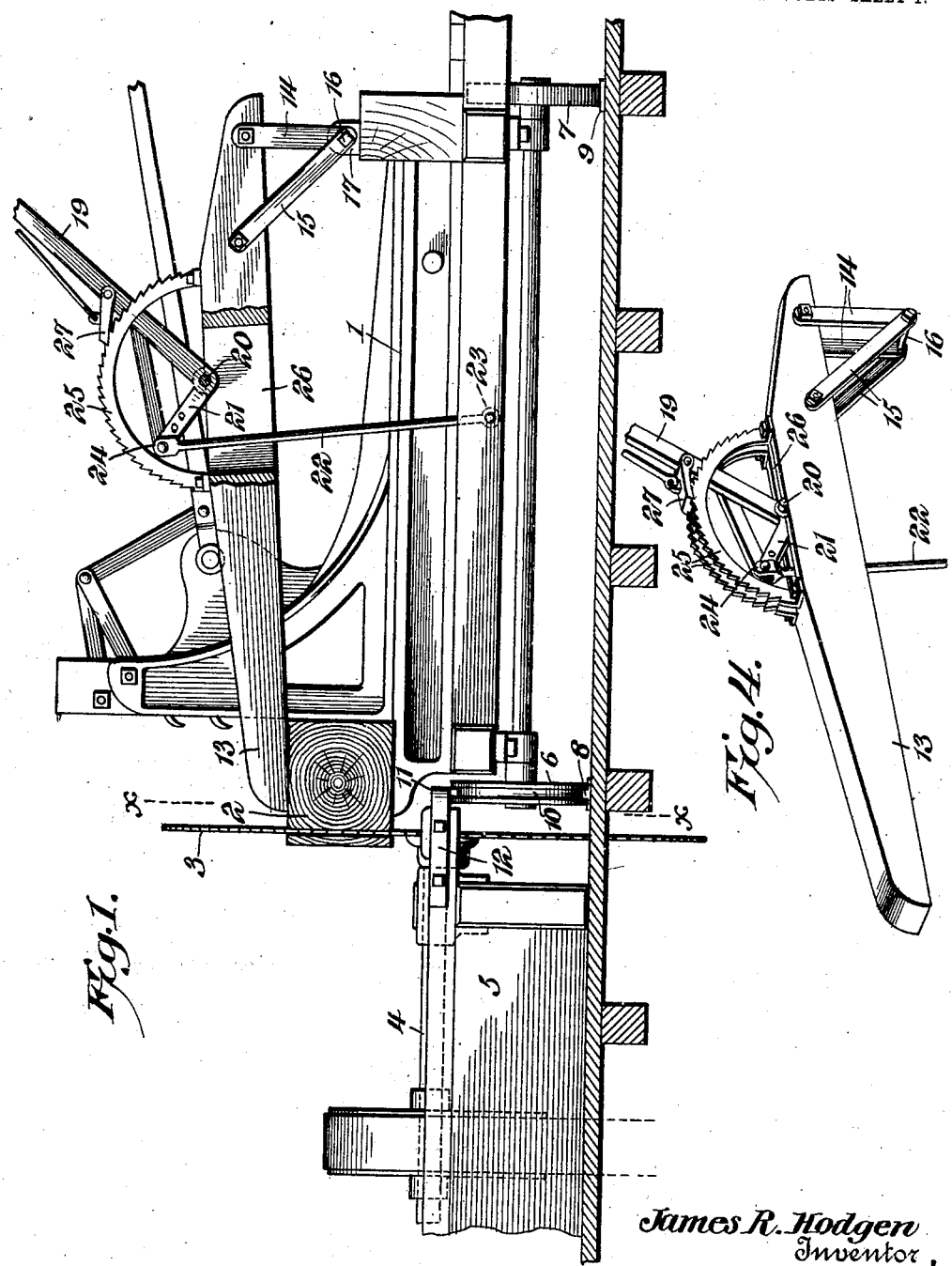

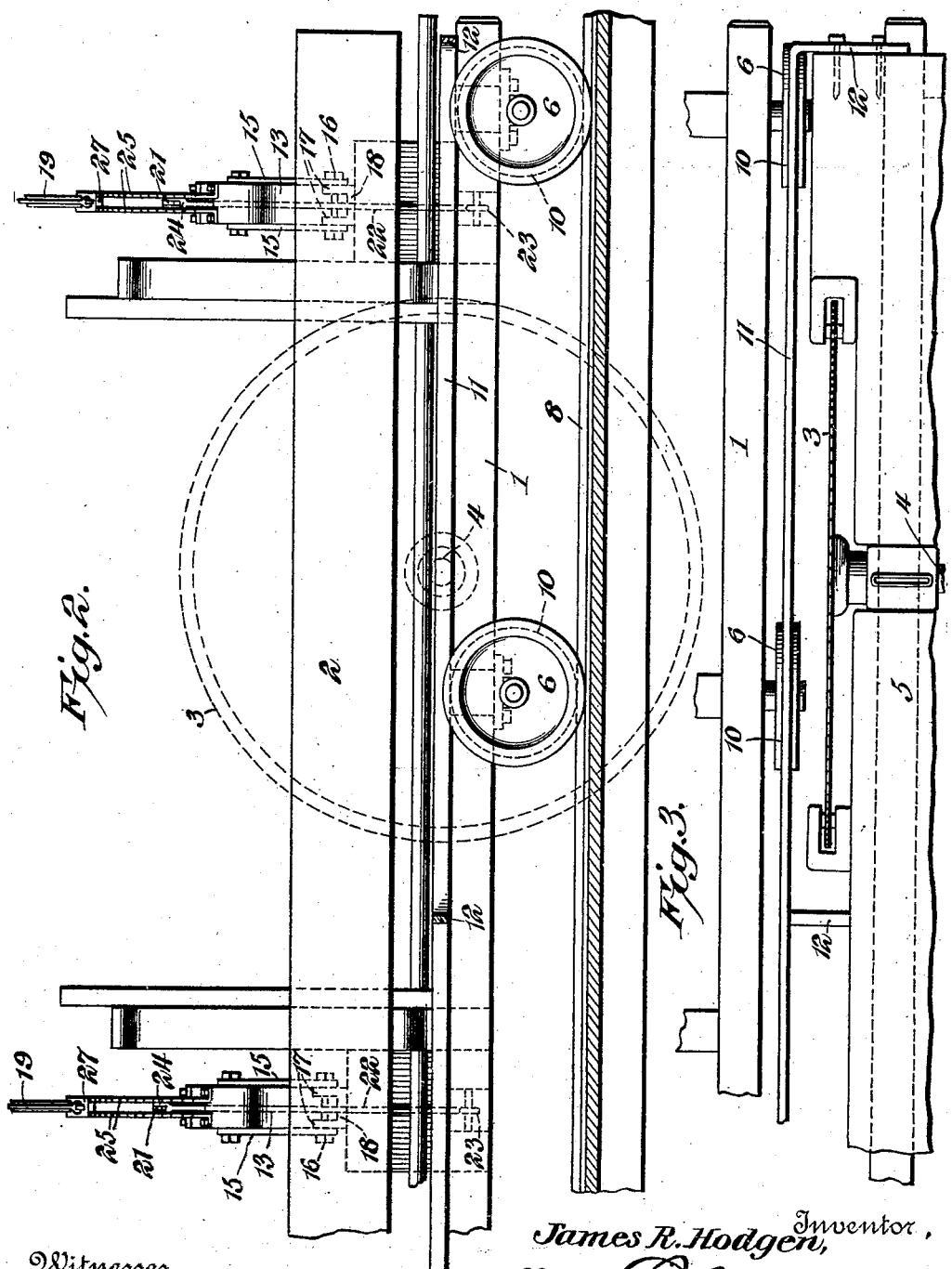

JAMES R. HODGEN, OF TENSAW, ALABAMA, ASSIGNOR OF ONE-HALF TO GEORGE J. CROSSLAND, OF MOBILE, ALABAMA.

SAWMILL APPLIANCE.

No. 918,152.  Specification of Letters Patent.  Patented April 13, 1909.

Application filed April 18, 1907. Serial No. 368,982.

*To all whom it may concern:*

Be it known that I, JAMES R. HODGEN, a citizen of the United States, residing at Tensaw, in the county of Baldwin and State of Alabama, have invented a new and useful Sawmill Appliance, of which the following is a specification.

The invention relates to a saw mill appliance.

The object of the present invention is to improve the construction of saw mills, and to provide simple and inexpensive means for increasing the capacity and for practically doubling the out-put of saw mills, by enabling lumber to be cut during the backward or return movement of a saw mill carriage.

A further object of the invention is to provide an appliance of this character, adapted to be readily applied to any ordinary saw mill, and capable of maintaining the saw mill carriage and the material firm and steady, during the backward or return movement, and adapted to prevent the carriage and the material from being lifted or turned over by the saw, which, during the return or backward movement of the carriage, strikes the material from underneath the same.

Another object of the invention is to enable the log to be readily released, when it is necessary to turn the same.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an end elevation partly in section, showing a saw mill appliance constructed in accordance with this invention, and applied to a saw husk and a saw mill carriage. Fig. 2 is a longitudinal sectional view, taken substantially on the line *x—x* of Fig. 1. Fig. 3 is a plan view of a portion of the saw mill husk and the saw mill carriage, illustrating the arrangement of the top rail. Fig. 4 is a detail perspective view of the top clamping block or member, and the means for operating the same.

Like numerals of reference designate corresponding parts in all the figures of the drawings.

1 designates a reciprocatory sawmill carriage, which may be of any preferred construction and which operates to carry a log 2 to a circular saw 3. The circular saw 3 is mounted on a shaft or mandrel 4, which is journaled in suitable bearings of a saw husk 5 and which may be operated in any suitable manner.

The saw mill carriage, which is equipped in the usual manner, is reciprocatable past the saw in both directions and is mounted on wheels 6 and 7, arranged to run on rails 8 and 9. The wheels 6 adjacent to the saw are grooved in the usual manner, and the bottom rail 8 is provided with a projecting rib or flange to fit the grooves 10 of the wheels 6.

In order to hold the saw mill carriage firm and steady during the backward or return movement of the same, when the saw strikes the log from underneath the latter, the saw husk is provided with a top rail 11, which fits in the grooves 10 of the wheels 6 at the tops thereof, and which effectually prevents the saw from lifting or over-turning the saw mill carriage. The top rail, which preferably consists of a rod of metal, arranged edgewise, may be of any preferred construction, and it is designed to be connected with the saw husk 5 by suitable transverse arms 12, secured to the saw husk in any preferred manner.

The log is held firmly on the saw mill carriage by means of a transversely disposed top block or clamping member 13, which prevents the material from being lifted or over-turned by the saw, when the latter strikes the log from underneath the same during the backward or return movement of the carriage. Any number of top blocks or members 13 may be employed, and each block or member, which extends across the saw mill carriage, is pivotally mounted at its rear end, or the end located at the side opposite that at which the saw is arranged. The rear end of the top block or member is supported by links or bars 14 and 15, arranged in pairs and located at the side faces of the block or member. The links or bars 14 are arranged substantially vertical, and the other links or bars 15 are inclined, and the upper terminals of both pairs of bars or members are secured to the top block or member by bolts, or other suitable fastening devices, and their lower ends are pivoted to the carriage by a suitable bolt or pin 16, which pierces the ends of the said bars or links 14 and 15, and which pass through upwardly extending ears 17 of a bracket or plate 18. The front end of the top block or member engages the log at the upper face thereof, as clearly illustrated in Fig. 1 of the accompanying drawings.

The top block or member is operated to raise and lower it from the log by means of a lever 19, consisting of a long arm or bar, extending upward from the top block or member and pivoted by a pin or bolt 20 to the same at the upper face thereof and provided at its pivoted end with a short arm 21, arranged substantially at right angles to the bar or body portion of the operating lever 19. The short arm 21 is connected with the saw mill carriage by means of a rod 22, pivoted at its lower end 23 to the frame of the carriage, and similarly connected at its upper end 24 to the outer end of the short arm 21. By this arrangement, the top block or member will be raised or lowered when the operating lever is oscillated.

The operating lever is guided in its oscillatory movement by a pair of spaced arcuate ratchet bars or members 25, secured at their terminals to the upper face of the top block or member, which is provided at an intermediate point with a longitudinal slot 26. The rod 22 and the short arm of the lever are adapted to operate in the longitudinal slot of the top block or member, and the lever is locked at any adjustment by means of a pivoted dog or detent 27, which is connected with suitable operating mechanism. The operating mechanism for raising and lowering the top block or member and the ratchet mechanism, is adapted to hold the said top block or member in engagement with the log, which may be readily released, when it is necessary to turn the same.

It will be seen that the improvements herein shown and described are adapted to be readily applied to any saw mill, and that the capacity of the same will be materially increased and the out-put practically doubled.

Having thus fully described my invention, what I claim as new and desire to secure by Letters Patent, is:—

1. The combination with a saw husk, a circular saw, and a track, of a saw mill carriage having supporting wheels and reciprocatable past the saw in both directions, a clamping member arranged to extend over and engage the top of the material for clamping the same upon the saw mill carriage, and a fixed top rail located above and arranged to engage the carriage supporting wheels nearer the saw to prevent the saw mill carriage from being lifted by the saw while cutting on the back or return movement of the carriage.

2. The combination with a saw, and a saw mill carriage, of a top block or member extending across the saw mill carriage and arranged to engage the upper face of the material for preventing the same from being lifted while cutting on the backward or return movement of the carriage, and means connected with the carriage and mounted on and carried by the top block or member for operating the latter.

3. The combination with a saw, and a saw mill carriage, of a transversely disposed top block or member extending across the saw mill carriage and pivotally mounted at its rear end and having its front end arranged to engage the material at the upper face thereof, an operating lever mounted on and carried by the top block or member, means for connecting the top block or member with the saw mill carriage, and means for locking the lever in its adjustment.

4. The combination with a saw, and a saw mill carriage, of a top block or member extending across the saw mill carriage, an operating lever fulcrumed on and carried by the top block or member and having an angularly disposed arm, a link or rod connecting the said arm with the saw mill carriage, whereby the top block or member will be raised and lowered when the lever is oscillated, and means for locking the lever in its adjustment.

5. The combination with a saw, and a saw mill carriage, of a pivotally mounted top block or member extending across the saw mill carriage, an operating lever mounted on and carried by the top block or member and having an arm, means for connecting the arm with the saw mill carriage, spaced arcuate ratchet members forming a guide for the lever, and a dog or detent carried by the lever for engaging the ratchet members.

6. The combination with a saw, and a saw mill carriage, of a transversely disposed top block or member, links mounted on the saw mill carriage and pivotally supporting the rear end of the top block or member, a lever mounted on and carried by the top block or member, a rod connecting the lever with the carriage, and means for locking the lever to hold the top block or member in engagement with the material.

7. The combination with a saw, and a saw mill carriage, of a transversely disposed top block or member extending across the saw mill carriage and provided between its ends with a slot and pivotally supported at its rear end, a lever mounted on and movable with the top block or member and fulcrumed at the slot and having the short arm extending from it at an angle and operable in the slot, a link or rod connecting the short arm with the saw mill carriage, and means for locking the lever in its adjustment.

8. The combination with a saw, and a saw mill carriage having supporting wheels, of a fixed top rail arranged at the side of the carriage adjacent to the saw in position for engaging the supporting wheels of the carriage at the top thereof, a top block or member extending across the saw mill carriage and arranged to engage the material at the top thereof, and means for operating the top block or member.

9. The combination with a saw, and a saw mill carriage provided with supporting wheels, of a transversely disposed clamping member located above and spaced from and extending across the saw mill carriage, means for pivotally connecting the rear end of the clamping member with the carriage, and operating mechanism mounted on the said member at a point between the ends thereof and movable with and carried by the said member and connected with the saw mill carriage.

In testimony, that I claim the foregoing as my own, I have hereto affixed my signature in the presence of two witnesses.

JAMES R. HODGEN.

Witnesses:
ELLIOTT G. RICKARBY,
C. J. TORREY.